United States Patent
Hantke et al.

(10) Patent No.: US 6,952,562 B1
(45) Date of Patent: Oct. 4, 2005

(54) METHOD FOR FILTERING A MOBILE RADIOTELEPHONE SIGNAL AND CORRESPONDING MOBILE RADIOTELEPHONE RECEIVER

(75) Inventors: Nico Hantke, Munich (DE); Jan Meyer, Weilheim (DE); Frank Von Bergen, Holzkirchen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/979,280

(22) PCT Filed: Apr. 6, 2000

(86) PCT No.: PCT/DE00/01063

§ 371 (c)(1),
(2), (4) Date: Mar. 4, 2002

(87) PCT Pub. No.: WO00/72454

PCT Pub. Date: Nov. 30, 2000

(30) Foreign Application Priority Data

May 21, 1999 (DE) .................................. 199 23 473

(51) Int. Cl.⁷ .............................................. H04B 1/10
(52) U.S. Cl. .................. 455/63.1; 455/67.13; 455/114.2
(58) Field of Search ......................... 455/63, 67.3, 423, 455/424, 425, 434, 443, 446, 449, 63.1, 63.2, 455/67.11, 67.13, 67.14, 67.16, 114.2, 115.1

(56) References Cited

U.S. PATENT DOCUMENTS

| | | | |
|---|---|---|---|
| 5,042,082 A | * | 8/1991 | Dahlin ........................ 455/437 |
| 5,307,515 A | | 4/1994 | Kuo et al. |
| 6,647,069 B1 | * | 11/2003 | Segal et al. .................. 375/278 |

FOREIGN PATENT DOCUMENTS

| EP | 0 542 520 A2 | 5/1993 |
|---|---|---|
| EP | 0 722 226 A1 | 7/1996 |
| EP | 0 887 944 A2 | 12/1998 |

* cited by examiner

*Primary Examiner*—Rexford Barnie
(74) *Attorney, Agent, or Firm*—Morrison & Foerster LLP

(57) ABSTRACT

The received mobile radiotelephone signal is analyzed in a mobile radiotelephone receiver (8) for the presence of adjacent channel interference and is only filtered if adjacent channel interference is determined, in order to suppress the same. The selectively filtered mobile radiotelephone signal is then conveyed, e.g. to an equalizer (12) for further processing.

16 Claims, 2 Drawing Sheets

METHOD FOR FILTERING A MOBILE RADIOTELEPHONE SIGNAL AND CORRESPONDING MOBILE RADIOTELEPHONE RECEIVER

CLAIM FOR PRIORITY

This application claims priority to International Application No. PCT/DE00/01063 which was published in the German language on Apr. 6, 2000.

TECHNICAL FIELD OF THE INVENTION

The present invention relates to a method for filtering a received mobile radiotelephone signal and to a mobile radiotelephone receiver.

BACKGROUND OF THE INVENTION

Mobile radiotelephone systems normally have a cellular structure which enables them to cover even larger physical areas with a limited frequency bandwidth. As shown in FIG. 2, cellular mobile radiotelephone systems of this type comprise a plurality of radio cells 17, a dedicated mobile radiotelephone channel being allocated to each radio cell. In one radio cell, the mobile radiotelephone channels of adjacent radio cells are not used. However, since the path loss in a mobile radiotelephone system of this type is limited, interference is caused in each radio cell 17, in particular due to the mobile radiotelephone channels of the immediately adjacent radio cells. Above all, this affects the boundary area between two adjacent radio cells 17. Interference of this type is referred to as adjacent channel interference. The adjacent channel signal-to-noise ratio, i.e. the ratio between the signal power and the noise power of adjacent channels, has a significant effect on the spectral efficiency of a mobile radiotelephone system.

In mobile radiotelephone receivers, the received mobile radio signal is normally conveyed to a receive filter for filtering. As shown in FIG. 3, the effect of a receive filter of this type depends primarily on the spectral position and power density S (f) of the adjacent channel interference. Thus, in the example shown in FIG. 3, adjacent channel interference occurs even after the receive filtering on both the lower end range 18, marked in black, and the upper end range 19, marked with hatching, of the frequency spectrum of the mobile radiotelephone channel no. 2 due to the mobile radiotelephone channels no. 1 and no. 3 of the adjacent radio cells. Whereas the residual adjacent channel interference in the lower end range 18 is negligible, the residual adjacent channel interference in the upper end range 19 is still relatively severe. In contrast to FIG. 3, real receive filters have no infinite edge steepness, whereby the interference effect of adjacent channels is further increased.

However, receive filters cannot be dimensioned in such a way that, on the one hand they suppress severe adjacent channel interference and thus improve the bit error rate, but, on the other hand, do not worsen the bit error rate if no adjacent channel interference occurs. A receive filter which is optimal for both cases cannot be dimensioned.

SUMMARY OF THE INVENTION

In one embodiment of the invention there is a method for filtering a mobile radiotelephone signal. The method includes, for example, filtering a mobile radiotelephone signal received via a mobile radiotelephone channel before processing, and analyzing the received mobile radiotelephone signal for adjacent channel interference, and if adjacent channel interference is determined in the received mobile radiotelephone signal, the signal is selectively filtered before processing to suppress the adjacent channel interference.

In another aspect of the invention, the received mobile radiotelephone signal comprises sampling values combined into bursts, wherein the mobile radiotelephone signal is analyzed in bursts, and a frequency spectrum of individual bursts in each case is analyzed.

In another aspect of the invention, in analyzing a burst of the received mobile radiotelephone signal, the adjacent channel interference is detected as energy included at an upper end of the frequency spectrum of the burst and energy included at a lower end of the frequency spectrum of the burst and are defined and compared with one another.

In another aspect of the invention, a quotient between the energies at the upper or lower end of the frequency spectrum of the burst is formed, and the adjacent channel interference is inferred if the quotient value lies outside a specific tolerance range around the value 1.

In yet another aspect of the invention, if the adjacent channel interference is detected, the sampling values of the analyzed burst are FIR low-pass filtered and output for processing.

In another aspect of the invention, frequency components at the end of the frequency spectrum of the burst for which a higher energy was detected are FIR low-pass filtered.

In another aspect of the invention, if the adjacent channel interference is detected, the sampling values of the analyzed burst are symmetrical FIR low-pass filtered and output for processing.

In still another aspect of the invention, in order to define the energy included at the upper end or at the lower end of the frequency spectrum of the burst, the frequency spectrum of the burst is shifted by an amount $-\Delta f$ or $+\Delta f$ and is low-pass filtered.

In another aspect of the invention, $\Delta f=101$ kHz.

In another aspect of the invention, the frequency spectrum of the burst is shifted by multiplying the sampling values of the burst by a shift sequence.

In yet another aspect of the invention, the shift sequence comprises eight values.

In another aspect of the invention, the frequency spectrum of the analyzed burst is shifted by $-\Delta f$ or $+\Delta f$ and is IIR low-pass filtered to define one of the energy included at the upper end of the frequency spectrum of the burst or at the lower end of the frequency spectrum of the burst.

In another aspect of the invention, in order to define the energy included at one of the upper end or the lower end of the frequency spectrum of the burst, the frequency spectrum of the burst is bandpass filtered with a passband range lying at the upper end of the frequency spectrum and bandpass filtered with a passband range lying at the lower end of the frequency spectrum.

In still another aspect of the invention, the method includes analyzing a burst of the mobile radiotelephone signal, detecting the adjacent channel interference by the energy of the frequency spectrum of the analyzed burst filtering the sampling values of the burst to eliminate the adjacent channel interference, and defining and comparing the energy of the frequency spectrum of the filtered burst with the energy of the frequency spectrum of the unfiltered burst, wherein the adjacent channel interference is inferred if the energy of the frequency spectrum of the unfiltered burst differs by more than a predefined tolerance value from the energy of the frequency spectrum of the filtered burst.

In another aspect of the invention, FIR filtering is carried out in the filtering of the burst which is to be analyzed.

In another aspect of the invention, if the adjacent channel interference is detected, the filtered sampling values are output for processing, and if no adjacent channel interference is detected the unfiltered sampling values are output for processing.

In yet another aspect of the invention, in order to compare the energy of the frequency spectrum of the unfiltered burst with the energy of the frequency spectrum of the filtered burst, the quotient $(E_{orig}-E_{filt})/E_{filt}$ is calculated and compared with the predefined tolerance value, where $E_{orig}$ corresponds to the energy of the frequency spectrum of the unfiltered burst and $E_{filt}$ corresponds to the energy of the filtered burst.

In another aspect of the invention, the energies are defined for the entire unfiltered or filtered burst, and the filtering is symmetrical filtering.

In another embodiment of the invention, there is a mobile radiotelephone receiver. The receiver includes, for example, a receive component to receive a mobile radiotelephone signal transmitted via a mobile radiotelephone channel, a demodulator to demodulate the received mobile radiotelephone signal, an equalizer to equalize the demodulated mobile radiotelephone signal before processing in the mobile radiotelephone receiver, an analyzing unit to analyze the demodulated mobile radiotelephone signal for the presence of adjacent channel interference, and a filter unit controlled by the analyzing unit, on detecting adjacent channel interference in the demodulated mobile radiotelephone signal, to selectively filter the signal to suppress adjacent channel interference and transmit it to the equalizer.

BRIEF DESCRIPTION OF THE DRAWINGS

The invention is described in detail below with reference to preferred embodiments and the attached drawings.

DETAILED DESCRIPTION OF THE PREFERRED EMBODIMENTS

The present invention provides a method for filtering a mobile radiotelephone signal and a corresponding mobile radiotelephone receiver. In particular, reliable filtering out of adjacent channel interference is enabled without increasing the bit error rate if adjacent channel interference does not occur.

According to one embodiment of the invention, the received mobile radiotelephone signal is first analyzed for the presence of adjacent channel interference, whereby filtering of the mobile radiotelephone signal takes place only if the analysis reveals that adjacent channel interference is actually present. Unnecessary filtering of a mobile radiotelephone signal which is not affected by adjacent channel interference is avoided by means of this selective or adaptive filtering of the received mobile radiotelephone signal.

The analysis and selective filtering of the receive signal can be implemented with the aid of a corresponding algorithm, the complexity of which is so low that it can be performed without further measures with a digital signal processor which is in any case already used in current mobile radiotelephones.

In mobile radiotelephone receivers which are operated, for example, according to the GSM mobile radiotelephone standard, complex sampling values are digitized in bursts for subsequent signal processing. The present invention therefore proposes that the receive signal is preferably analyzed in bursts before being conveyed to the equalizer contained in the mobile radiotelephone receiver, whereby the frequency spectrum of the analyzed burst is in each case evaluated. If interference from at least one adjacent channel interference source is detected in this analysis, corresponding filtering is carried out, whereas no filtering takes place if no adjacent channel interference is determined.

The parameters of the decision criterion for the detection of adjacent channel interference can be defined in such a way that the bit error rates with adjacent channel interference sources are clearly improved compared with signal processing without the use of the present invention and, at the same time, no deterioration occurs if no adjacent channel interference sources are present, e.g. in the case of common channel interference or noise.

Figure 1:
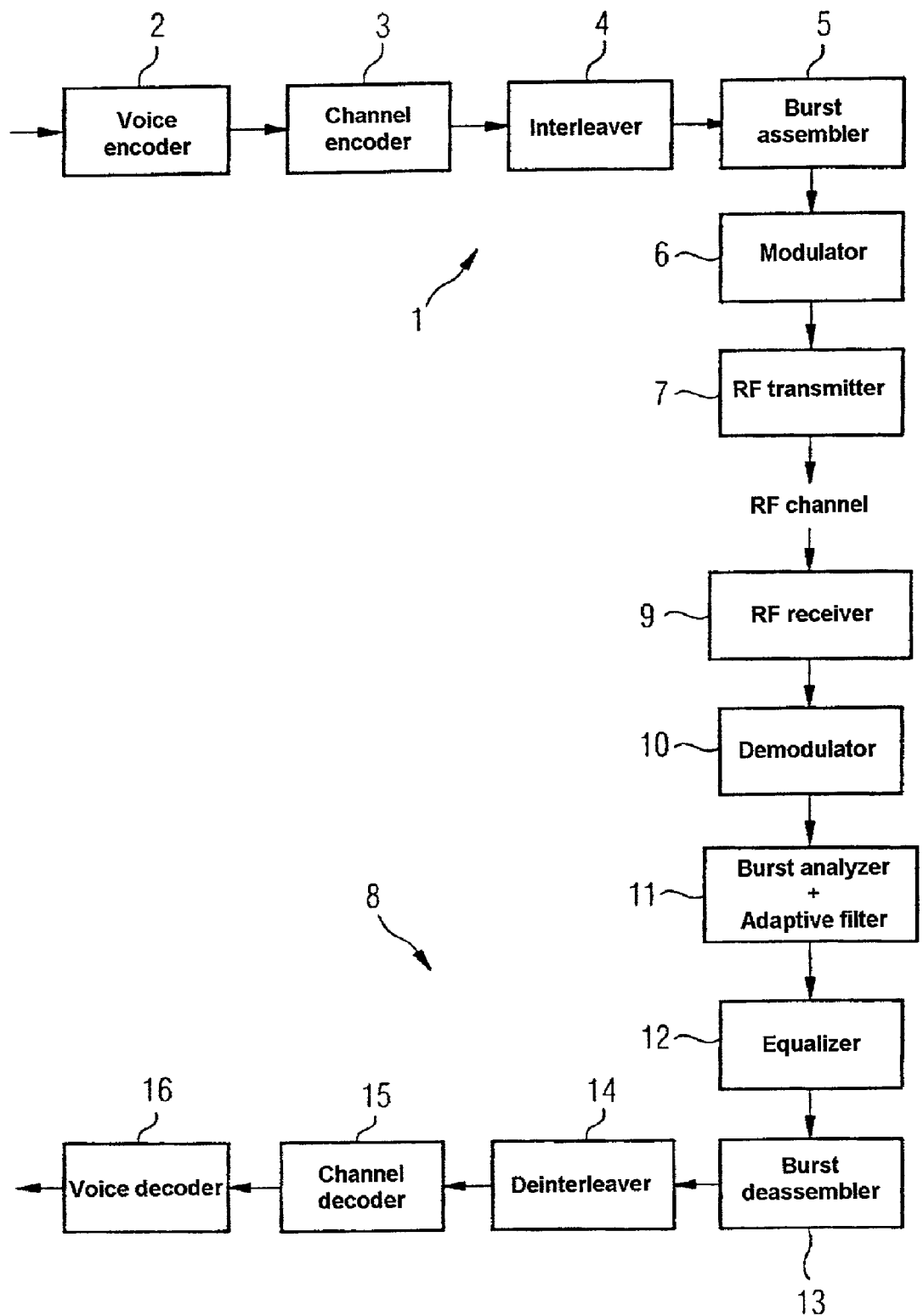
FIG. 1 shows a simplified structure of a mobile radiotelephone system comprising a transmitter and a receiver, the present invention being used in the receiver.
Figure 2:
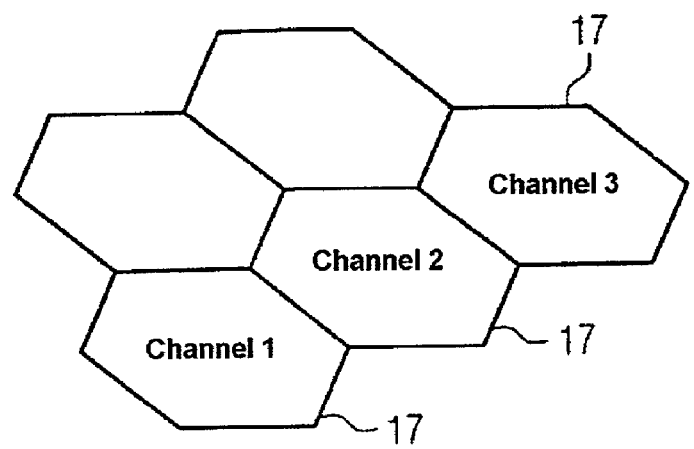
FIG. 2 shows a representation to explain the structure of cellular mobile radiotelephone networks.

FIG. 1 schematically shows the structure of a mobile radiotelephone transmitter 1 and a mobile radiotelephone receiver 8. The transmitter 1 comprises a voice encoder 2, which converts an analog voice signal which is to be transmitted into a digital bit stream and conveys it to a channel encoder 3. The channel encoder 3 adds additional redundant bits or information, which can be evaluated at the receiving end to detect transmission errors, to the actual user data bits depending on a specific channel-encoding method. The output data of the channel encoder 3 are conveyed to an interleaver 4 which temporally rearranges these data in order to produce a quasi-memoryless channel. A burst assembler 5, which embeds the data to be transmitted into a frame structure and conveys them in the form of bursts, i.e. physical channels, to a modulator 6, is connected downstream of the interleaver 4. The modulator 6 modulates the information to be transmitted onto a carrier signal which is finally transmitted from a radio-frequency transmit component 7 via a radio-frequency channel to the mobile radiotelephone receiver 8.

The receiver 8 correspondingly has a radio-frequency receive component 9, a demodulator 10, a burst deassembler 13, a deinterleaver 14, a channel decoder 15 and a voice decoder 16, which in each case reverse the functions of the components of the transmitter 1 explained above. In addition, according to FIG. 1, an equalizer 12, upstream of which a unit 11 for spectral analysis of the receive signal and for selective or adaptive receive filtering is connected, is provided between the demodulator 10 and the burst deassembler 13.

The function of this unit 11 will be examined more closely below.

The purpose of the unit 11 is to analyze the bursts received by the receiver 8 and, depending on the result of the analysis, to assess the presence of adjacent channel interference. If adjacent channel interference is detected in the frequency spectrum of the analyzed burst, the latter's sampling values, which, originating from the demodulator 10, normally occur in complex digital form, are filtered in order to eliminate the adjacent channel interference, whereas, if no adjacent channel interference is detected, the sampling values of the burst are conveyed unchanged to the downstream equalizer 12 and the following components for further signal processing. The function of the unit 11 is preferably performed by the digital signal processor, which is provided in any case in mobile radiotelephones, according to a corresponding algorithm.

The algorithm which is to be performed by the unit 11 can be implemented in different ways involving different computing outlay, whereby four embodiments of the present invention will be explained below.

Figure 3:
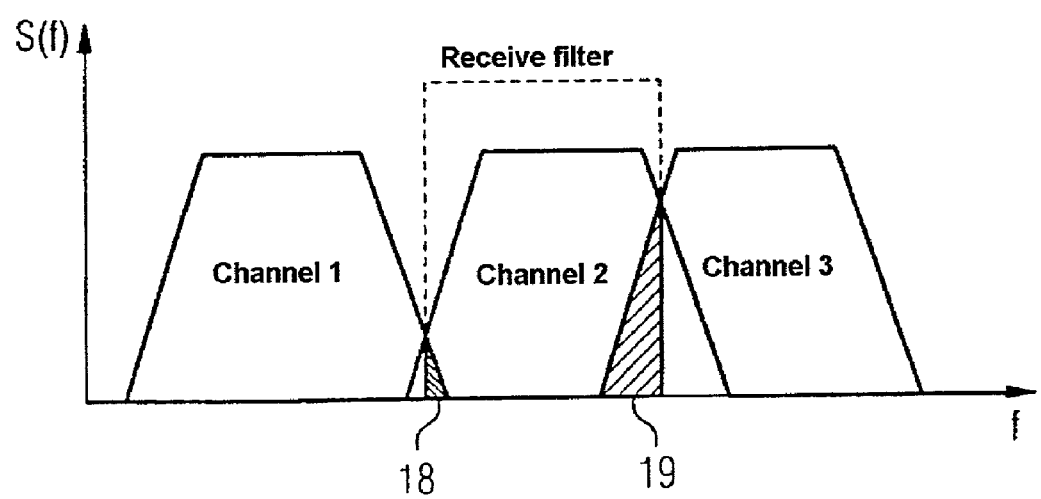
FIG. 3 shows a representation to explain adjacent channel interference.

According to a first embodiment, it is proposed, in order to detect adjacent channel interference, initially to determine the energy in a narrow frequency band at the lower end (for example in the range 18 shown in FIG. 3) and at the upper end (for example, in the range 19 shown in FIG. 3) of the frequency spectrum of the burst which is to be analyzed. The energies thus defined at the lower and upper end of the burst spectrum are then compared with one another, for which purpose quotient formation is particularly recommended, since this enables a decision which is independent of the mean burst energy. Without adjacent channel interference sources, the quotient thus formed is ideally equal to 1, so that adjacent channel interference sources can be identified by comparing the quotient value with a tolerance range around the value 1, i.e. with a lower and an upper limit value. If the quotient value lies outside this tolerance range, the presence of adjacent channel interference is inferred.

If adjacent channel interference sources are detected in this way, filtering of the original received sampling values of the corresponding burst is carried out in order to eliminate the adjacent channel interference source(s). This filtering is preferably carried out only for the side of the burst spectrum which reveals the higher interference energy. For this purpose, the filtering can be designed in the form of non-recursive digital FIR (Finite Impulse Response) low-pass filtering with a linear phase response, whereby the frequency response of the FIR filter used for this purpose to filter the burst spectrum is asymmetrical to the Y-axis, i.e. to the middle of the burst spectrum, on the interference-affected side only and, for this reason, has complex filter coefficients. However, filtering which differs from FIR filtering, in particular e.g. IIR filtering with a, to some extent, linear phase response, can also be used. After the filtering, the sampling values are forwarded to the equalizer 12 for further processing.

As described above, the energy at the lower and upper end of the burst spectrum needs to be defined according to this first embodiment. For this purpose, the spectrum of the complex sampling values of the burst can be shifted by a value +Δf or a value −Δf, and the shifted burst spectrum can then in each case be low-pass filtered. Recursive digital IIR (Infinite Impulse Response) filtering is preferably used here, since, in this case, the implementation outlay is lower compared with FIR filtering and, furthermore, the non-linear phase response of the IIR low-pass filtering does not interfere with the detection.

The burst spectrum can be shifted in accordance with the modulation set of the Fourier transformation in each case by multiplying the sampling values of the burst by a corresponding shift sequence. This shift sequence has different lengths, depending on the required frequency shift. A frequency shift of Δf=101 kHz has proven to be advantageous, since adjacent channel interference can be detected even with this shift, and the shift sequence comprises only eight (in some cases complex) values. However, other frequency shifts are obviously possible.

Instead of the double shift of the burst spectrum with subsequent low-pass filtering, filtering of the burst spectrum can also be carried out with no shift, using two bandpass filters whose passbands correspondingly lie in the range of the lower or upper end of the burst spectrum.

According to a second preferred embodiment of the present invention, a permutation of the aforementioned first embodiment is provided in such a way that a symmetrical FIR filter is used to suppress adjacent channel interference. In this case, following identification of adjacent channel interference, not only the interference-affected part of the burst spectrum, but also the possibly unaffected part on the other side of the burst spectrum is filtered independently of the interference-affected side of the burst spectrum. This procedure offers the advantage that, due to the use of a symmetrical filter, the latter has real filter coefficients and the computing outlay can thus be roughly halved.

According to a third embodiment of the present invention, an alternative procedure which differs from the two previous embodiments is proposed for defining and filtering adjacent channel interference.

According to this third embodiment, the total energy $E_{orig}$ of the burst spectrum is first defined. Symmetrical FIR filtering is then essentially carried out, i.e. the burst is initially treated as if adjacent channel interference was present. An assessment is subsequently carried out in order to ascertain whether this filter measure was or was not actually justified, for which purpose the energy $E_{filt}$ of the filtered burst spectrum or the corresponding sampling values is defined and compared with the energy $E_{orig}$ of the unfiltered original burst spectrum, whereby calculation of the following expression is particularly appropriate for this purpose:

$$\frac{E_{orig} - E_{filt}}{E_{orig}}$$

The expression thus defined is compared with a limit value whose parameters can be defined, whereby the presence of adjacent channel interference can be inferred if this expression is greater than the limit value, i.e. if $E_{orig}$ is clearly greater than $E_{filt}$.

If adjacent channel interference was detected in this way, the filtering already carried out was justified, and the filtered sampling values are conveyed to the equalizer 12 shown in FIG. 1 for further processing. If, on the other hand, as a result of the calculation of the above expression, no adjacent channel interference was detected, the filtering which was carried out was not justified, and the original unfiltered sampling values are conveyed to the equalizer 12 for further processing.

The third embodiment described above offers the advantage that the frequency shift routines and IIR filterings required in the first two embodiments are superfluous, and the outlay required for noise signal suppression can thus be further reduced.

According to a fourth embodiment of the present invention, the third embodiment can be varied in such a way that the method steps are no longer applied to an entire burst, but are used separately for each burst half, i.e. the calculations described above, inter alia, are carried out separately for both halves of the burst which is to be analyzed. This offers the advantage that noise signals with a temporal fading pattern which differs greatly compared with the user data signal can be more effectively detected. Thus, for example, a noise signal which occurs during only a half burst period can be more effectively detected and eliminated. In addition, unnecessary filtering of the second burst half can be avoided if necessary using this method.

What is claimed is:

1. A method for filtering a mobile radiotelephone signal, comprising:

filtering a mobile radiotelephone signal received via a mobile radiotelephone channel before processing; and analyzing the received mobile radiotelephone signal for adjacent channel interference, and if adjacent channel interference is determined in the received mobile radiotelephone signal, the signal is selectively filtered before processing to suppress the adjacent channel interference, wherein the received mobile radiotelephone signal comprises sampling values combined into bursts, the mobile radiotelephone signal being analyzed in bursts, and a frequency spectrum of individual bursts in each case is analyzed, in analyzing a burst of the received mobile radiotelephone signal, the adjacent channel interference is detected as energy included at an upper end of the frequency spectrum of the burst and energy included at a lower end of the frequency spectrum of the burst and are defined and compared with one another, and if the adjacent channel interference is detected, the sampling values of the analyzed burst are filtered and output for processing.

2. The method as claimed in claim 1, wherein a quotient between the energies at the upper or lower end of the frequency spectrum of the burst is formed, and the adjacent channel interference is inferred if the quotient value lies outside a specific tolerance range around the value 1.

3. The method as claimed in claim 1, wherein frequency components at the end of the frequency spectrum of the burst for which a higher energy was detected are filtered.

4. The method as claimed in claim 1, wherein if the adjacent channel interference is detected, the sampling values of the analyzed burst are symmetrical filtered and output for processing.

5. The method as claimed in claim 1, wherein in order to define the energy included at the upper end or at the lower end of the frequency spectrum of the burst, the frequency spectrum of the burst is shifted by an amount $-\Delta f$ or $+\Delta f$ and is low-pass filtered.

6. The method as claimed in claim 5, wherein $\Delta f=101$ kHz.

7. The method as claimed in claim 5, wherein the frequency spectrum of the burst is shifted by multiplying the sampling values of the burst by a shift sequence.

8. The method as claimed in claim 7, wherein the shift sequence comprises eight values.

9. The method as claimed in claim 5, wherein the frequency spectrum of the analyzed burst is shifted by $-\Delta f$ or $+\Delta f$ and is IIR low-pass filtered to define one of the energy included at the upper end of the frequency spectrum of the burst or at the lower end of the frequency spectrum of the burst.

10. The method as claimed in claim 1, wherein to define the energy included at one of the upper end or the lower end of the frequency spectrum of the burst, the frequency spectrum of the burst is bandpass filtered with a passband range lying at the upper end of the frequency spectrum and bandpass filtered with a passband range lying at the lower end of the frequency spectrum.

11. The method as claimed in claim 1, further comprising:

analyzing a burst of the mobile radiotelephone signal;

detecting the adjacent channel interference by the energy of the frequency spectrum of the analyzed burst;

filtering the sampling values of the burst to eliminate the adjacent channel interference; and defining and comparing the energy of the frequency spectrum of the filtered burst with the energy of the frequency spectrum of the unfiltered burst, wherein the adjacent channel interference is inferred if the energy of the frequency spectrum of the unfiltered burst differs by more than a predefined tolerance value from the energy of the frequency spectrum of the filtered burst.

12. The method as claimed in claim 11, wherein FIR filtering is carried out in the filtering of the burst which is to be analyzed.

13. The method as claimed in claim 11, wherein if the adjacent channel interference is detected, the filtered sampling values are output for processing, and if no adjacent channel interference is detected the unfiltered sampling values are output for processing.

14. The method as claimed in claim 11, wherein to compare the energy of the frequency spectrum of the unfiltered burst with the energy of the frequency spectrum of the filtered burst, the quotient $(E_{orig}-E_{filt})/E_{filt}$ is calculated and compared with the predefined tolerance value, where $E_{orig}$ corresponds to the energy of the frequency spectrum of the unfiltered burst and $E_{filt}$ corresponds to the energy of the filtered burst.

15. The method as claimed in claim 11, wherein the energies are defined for the entire unfiltered or filtered burst, and the filtering is symmetrical filtering.

16. A mobile radiotelephone receiver, comprising:

a receive component to receive a mobile radiotelephone signal transmitted via a mobile radiotelephone channel;

a demodulator to demodulate the received mobile radiotelephone signal;

an equalizer to equalize the demodulated mobile radiotelephone signal before processing in the mobile radiotelephone receiver; and an analyzing unit to analyze the demodulated mobile radiotelephone signal for the presence of adjacent channel interference, wherein the received mobile radiotelephone signal comprises sampling values combined into bursts, the mobile radiotelephone signal being analyzed in bursts, and a frequency spectrum of individual bursts in each case is analyzed, in analyzing a burst of the received mobile radiotelephone signal, the adjacent channel interference is detected as energy included at an upper end of the frequency spectrum of the burst and energy included at a lower end of the frequency spectrum of the burst and are defined and compared with one another, and if the adjacent channel interference is detected, the sampling values of the analyzed burst are filtered and output for processing.

* * * * *